United States Patent Office 2,779,087
Patented Jan. 29, 1957

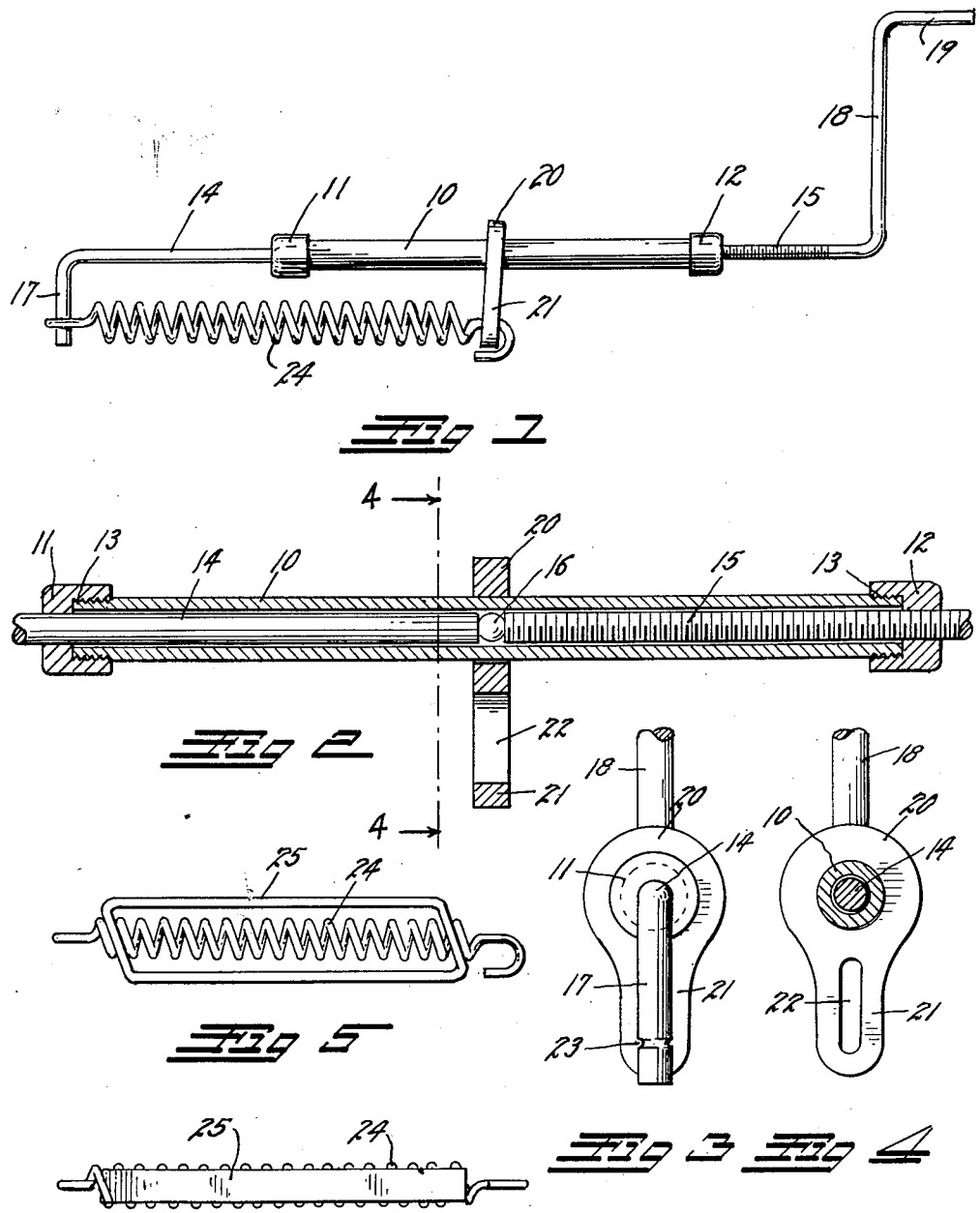

2,779,087

DEVICE FOR INSTALLING TENSION SPRINGS ON AUTOMOBILE HOOD HINGES

Alva V. Shahan, Goodland, Kans.

Application October 1, 1953, Serial No. 383,591

1 Claim. (Cl. 29—227)

This invention relates to a device for stretching tension springs and for retaining the springs in the stretched condition. While the device is useful for stretching tension springs for any desired purpose, it is more particularly designed for removing and installing the conventional hood springs used for holding the hoods of automotive vehicles in the open position.

The principal object of the invention is to provide a simple, economical, and easily used device for stretching any given tension spring to any desired degree of extension, and to facilitate the installation and removal of the spring.

Another object of the invention is to provide means for retaining a spring in the stretched condition when removed from the stretching device, in order that the spring may be quickly and easily installed in cramped quarters, such as encountered under the hoods of automotive vehicles.

A further object is to provide a spring-retaining device for use on automotive hood springs which will enable the hood to be employed as a spring-stretching device, and which will enable the stretched springs to be removed from the hood in the stretched condition for easy replacement.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the stretching element of the improved spring stretcher as it would appear in the act of stretching a spring;

Fig. 2 is an enlarged, longitudinal section through the mid-portion of the spring-stretching element;

Fig. 3 is a forward end view of the improved stretching element;

Fig. 4 is a cross-section, taken on the line 4—4, Fig. 2;

Fig. 5 is a top view of a spring-retaining element employed with the stretching element, illustrating a stretched spring in place therein; and Fig. 6 is a side view of the retaining element of Fig. 5.

The invention comprises two elements which cooperate with each other in use, a stretching element as illustrated in Figs. 1–5, and a retaining element as illustrated in Figs. 5 and 6.

The invention comprises two elements which cooperate with each other in use, a stretching element as illustrated in Figs. 1–5, and a retaining element as illustrated in Figs. 5 and 6.

The stretching element or device comprises a tubular barrel 10 closed at its forward extremity by means of a guide cap 11, and at its rearward extremity by means of a threaded cap 12. The caps 11 and 12 are threaded onto the extremities of the barrel 10 through the medium of suitable threads 13. A rod-like spring arm 14 is slidably mounted in the cap 11, and a threaded crank shaft 15 is threaded through the cap 12.

The extremities of the arm 14 and the shaft 15 may contact each other within the barrel 10. It is preferred, however, to place a thrust ball 16 between the adjacent extremities within the barrel to relieve friction. The forward extremity of the spring arm 14 is turned at right angles to the remainder of the arm to provide a spring-receiving portion or hook 17 having a spring-receiving notch 23. The crank shaft 15 is turned at right angles to form a crank portion 18 and a hand grip 19.

A bracket plate 20 is slidably mounted on the barrel 10, and is provided with a spring-receiving bracket arm 21 depending therefrom. The bracket arm 21 is formed with an elongated, spring-receiving opening 22.

In use, the crank shaft 15 is unscrewed sufficiently to allow the hook 17 to aproach the barrel 10, and the spring arm 14 is forced into the barrel 10 as far as possible. One extremity of the spring to be stretched, indicated at 24, is hooked about the spring hook 17. The other extremity of the spring is passed through the slotted opening 22 and hooked about the lower extremity of the spring bracket arm 21. The bracket plate 20 is then pulled rearwardly along the barrel as far as manually possible.

The barrel-receiving opening in the plate 20 is slightly larger than the diameter of the barrel 10, so that the reaction of the spring 24 will tend to tilt the plate 20 on the barrel 10, causing it to clamp itself to the barrel to prevent forward movement in the direction of the pull of the spring 24.

The crank portion 18 is now rotated to screw the shaft 15 through the cap 12 against the arm 14 to force the latter outwardly from the forward extremity of the barrel. This movement is communicated through the spring hook 17 to the spring 24 to stretch the latter to any desired degree of extension.

It is difficult in most installations to install the stretched spring directly from the spring-stretching device. Therefore, a stretched spring retainer is provided. The retainer comprises an open frame 25 of elongated rhomboidal shape. The frame is formed by bending a flat, rigid bar and welding the extremities together to provide two long, parallel side members and two short, parallel end members. The end members are inclined at an angle to the side members, the angle substantially corresponding to the natural angle of the helix of the stretched spring 24.

When the spring is in the stretched position of Fig. 1, the frame 25 is forced against the spring so that the inclined end members of the frame will slip between the extreme end turns of the spring. The crank shaft 15 can now be unscrewed from the barrel 10 so that the ends of the spring may be unhooked from the spring hook 17 and the spring bracket arm 21 while retaining the spring stretched, as shown in Figs. 5 and 6.

The hooked ends of the stretched spring are now exposed and can be easily hooked onto the apparatus into which the spring is to be installed. When employed on installing hood springs, the hood can be brought to a spring-retracted position and the extremities of the spring hooked in place. The hood can then be raised to the spring-stretching position, which will stretch the spring still further to release it from the retaining frame 25, which can then be simply slipped from place, leaving the spring permanently installed.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

A spring stretching device comprising: a tubular barrel having threaded extremities; a guide cap provided with a concentric rod guide opening threaded on one extremity of said barrel; a threaded cap having a concentric, threaded shaft opening threaded on the other extremity of said barrel; a rod extending through the rod opening in said guide cap into said barrel; a threaded shaft threaded through the shaft opening in said threaded cap and extending into said barrel; a freely movable ball positioned in said barrel between the inner extremities of said rod and said shaft; a hand crank formed on the outer extremity of said shaft; a hook formed on the outer extremity of said rod and extending at right angles thereto; a spring receiving notch formed in and adjacent the extremity of said hook and adapted to receive one hooked extremity of a spring; a bracket plate slidably mounted on said barrel, said bracket plate having sufficient thickness so that when urged at an angle to said barrel it will clamp against the latter; and an elongated opening in said plate said opening being adapted to receive the other hooked extremity of a spring to allow the latter to be hooked over the extremity of the plate in alignment with said notch so that rotation of said threaded shaft will force said ball against said rod to urge the latter outwardly to stretch said spring.

References Cited in the file of this patent

UNITED STATES PATENTS

| | | |
|---|---|---|
| 821,149 | Alphandery | May 22, 1906 |
| 1,050,746 | Morgan | Jan. 14, 1913 |
| 1,677,934 | Sulentic | July 24, 1928 |
| 1,707,870 | Morton | Apr. 2, 1929 |
| 2,188,838 | Kimbrell | Jan. 30, 1940 |
| 2,465,030 | Myers | Mar. 22, 1949 |
| 2,494,252 | Mearns | Jan. 10, 1950 |
| 2,589,042 | Brenneman | Mar. 11, 1952 |